April 22, 1958

C. W. MATTHEWS ET AL 2,831,415

PLOW BOTTOM

Filed July 26, 1955

INVENTORS.
CHARLES W. MATTHEWS
CARL V. BECKSTROM

BY

ATTORNEYS

United States Patent Office 2,831,415
Patented Apr. 22, 1958

2,831,415

PLOW BOTTOM

Charles W. Matthews, East Moline, and Carl V. Beckstrom, Moline, Ill., assignors to Deere & Company, Moline, Ill., a corporation of Illinois Application July 26, 1955, Serial No. 524,569

10 Claims. (Cl. 97—113)

The present invention relates generally to agricultural implements for and more particularly to moldboard plows.

The object and general nature of the present invention is a provision of a new and improved frog with which means is provided for securing a firm and rigid connection of the plow share with the frog so that breakage, as when operating under difficult conditions, is largely avoided. More specifically, it is a feature of this invention to provide a new and improved plow construction, especially adapted for use with the so-called plate shares or throw-away shares, with means providing for additional attaching means, connecting the share with the frog, which additional means is located close to the point of the share and the frog and provides a stronger connection between these parts than has heretofore been provided.

Particularly, it is a feature of this invention to provide a plow frog with a moldboard section and a landside section, the forward portion of the latter section being divided or otherwise provided with two laterally spaced apart portions that are secured to the moldboard section, with share attaching means located in the space between said divided or bifurcated portions. In this way, the share-attaching means may be brought relatively close to the forward point of the share and thereby provide a strong and rigid connection at this point.

These and other objects and advantages of the present invention will be apparent to those skilled in the art after a consideration of the following detailed description, taken in conjunction with the accompanying drawings, in which.

Figure 1:
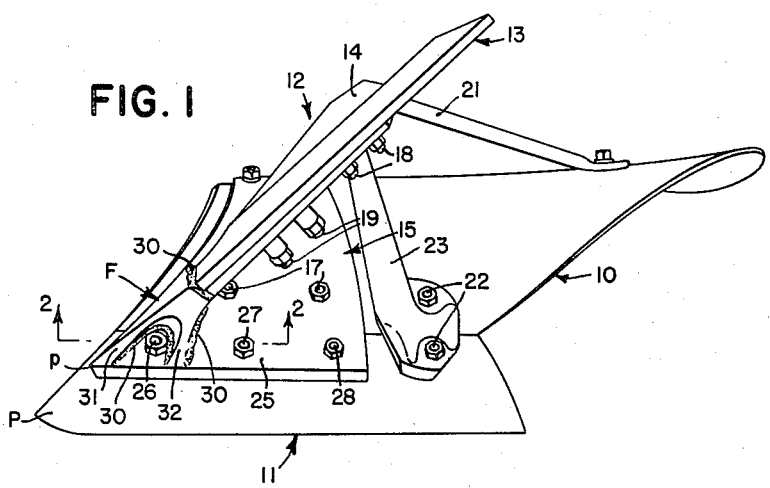
Fig. 1 is a bottom view, in the nature of a perspective, of a moldboard plow in which the principles of the present invention have been incorporated.
Figure 2:
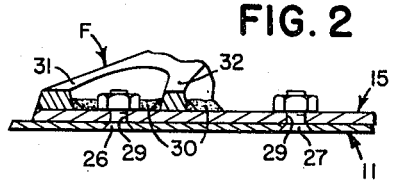
Fig. 2 is an enlarged sectional view taken generally along the line 2—2 of Fig. 1.

Referring first to Figs. 1 and 2, the plow incorporating the present invention is illustrated as including a moldboard 10, a share 11 and a frog 12 to which the moldboard 10 and share 11 are connected. The plow also includes a landside 13. The frog 12 comprises a landside section 14 and a moldboard section 15, these parts respectively receiving the landside 13 and the moldboard 10. Preferably, the moldboard 10 is connected to the moldboard-receiving section 15 by means that includes a pair of plow bolts 17, and the landside 13 is fixed to the laterally outer face of the landside section 14 by means of a pair of bolts 18. A beam (not shown), to which the plow is connected and which serves as the support for the plow, is connected to the frog 12 by a pair of beam bolts 19. The wing portion of the moldboard 10 is connected by a brace 21 with the rear portion of the landside section 14, and the lower portion of the moldboard 10, and the forward portion of the share 11 are connected by bolts 22 with a lower brace 23.

According to the principles of the present invention, the share 11 is fastened to the lower or share-receiving portion 25 of the moldboard-receiving section 15 of the frog 12 by means of three plow bolts 26, 27 and 28, the lower portion of the moldboard section 15 being apertured, as at 29, to receive the bolts 26, 27 and 28. It is desirable to have the landward attaching bolt 26 as close as possible to the point P of the share 11 and to provide adequate strength and support for the point p of the frog 12 so as to sustain the stresses involved in plowing under difficult soil conditions, as where there are large rocks or other obstacles, or the like.

One way to do this is to provide, according to the principles of the present invention, a re-enforcement for the point of the frog and to provide for the disposition of a share-attaching bolt, such as the bolt 26, as close as possible to the landside edge of the plow bottom and the point P of the share 11. Figs. 1 and 2 show how this is accomplished through the use of a forgoing F in the form of a bifurcated section, having forwardly diverging portions 31 and 32 secured, as by welding 30, to the underside of the moldboard receiving section 15, the portions 31 and 32 being disposed on opposite sides of the aperture 29 (Fig. 2) in the moldboard-receiving section 15 of the frog 12. It is to be noted that one section 31 extends generally parallel to the landside edge of the plow bottom and lies in a plane that is generally parallel with respect to and disposed laterally outside of the plane of the landside section 14 of the frog 12. It will also be noted that, in effect, the forging F forms a part of the landside section 14, the landward portion 31 of the forging F being disposed in the plane of the landside 13, so that when the latter is bolted to the landside-receiving section 14 of the frog 12, the portion 31 of the forging F and the landside 13 of the plow bottom are disposed in cooperating coplanar relationship. It will also be noted that the inner portion 32 of the forging F is disposed generally perpendicular to the forward edge of the share-receiving portion 25 of the moldboard-receiving section 15. In this way, the point p of the frog 12 is re-enforced and, in addition, the landward bolt 26 is disposed close to the landside plane of the plow bottom and relatively close to the point P of the share 11.

Figure 3:
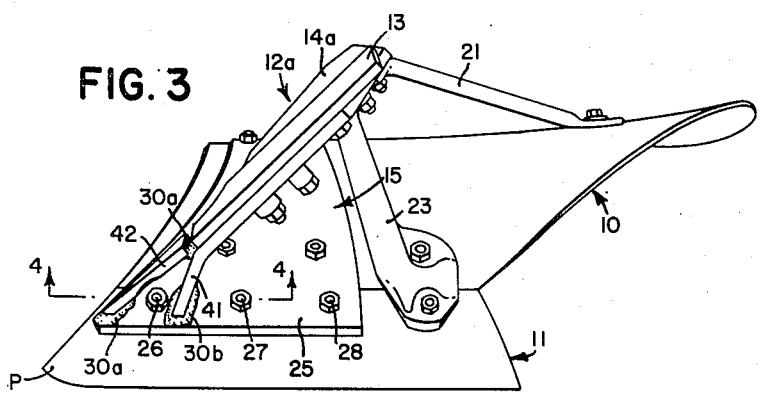
Fig. 3 is a view similar to Fig. 1, showing a modified form of the present invention.
Figure 4:
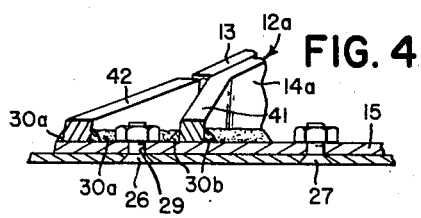
Fig. 4 is an enlarged sectional view taken generally along the lines 4—4 of Fig. 3.

A modified form of the present invention is shown in Figs. 3 and 4. In this form of the invention, a number of the parts described above have been used, and hence as to these parts the same reference numerals are employed. The frog 12a has a landside-receiving section 14a that at its forward end includes a portion 41 that is bent forwardly relative to the plane of the general portion of the landside section 14a, the portion 41 lying approximately perpendicular to the lower edge of the share-receiving portion 25 of the moldboard-receiving section 15. Preferably, the angle of the section 41 corresponds approximately to the angle of the section 32, shown in Fig. 1 and described above. The other portion 42 of the landside section 12a is formed by a generally triangular member, shown in 42, that is secured, as by welding 30a, to the adjacent portions of the moldboard receiving section 15 and to the adjacent portions of the landside receiving section 14a. The portions 41 and 42 diverge forwardly, as do the portions 31 and 32 shown in Fig. 1, and the opening 29 in the moldboard-receiving section 15 of the frog 12a is disposed between the divergent portions 41 and 42 of the landside section 12a. The portion 41, which lies approximately perpendicular to the lower edge of section 25, is secured by welding 30b to the adjacent portions of the moldboard-receiving section 15. The disposition of the share-attaching bolt 26 closely adjacent the landside edge of the plow bottom appreciably strengthens the connection of the point P of the share 11 with frog 12a.

While we have shown and described above the preferred structure in which the principles of the present invention have been incorporated, it is to be understood that my invention is not to be limited to the particular details, shown and described above, but that, in fact, widely different means may be employed in the practice of the broader aspects of our invention.

What we claim, therefore, and desire to secure by Letters Patent is:

1. In a plow, a frog comprising a landside section and a moldboard section interconnected to form a forward point, and reenforcing means disposed adjacent said forward point and including a pair of parts, one in a plane disposed parallel to and closely adjacent the plane of said landside section and extending from the landside section forwardly to said forward point, the other part extending divergently forward from said one part toward and substantially to the lower edge of the moldboard section at a point thereon spaced from the lower portion of said one part.

2. In a plow, a frog comprising a landside section and a moldboard section interconnected to form a forward point, and reenforcing means disposed adjacent said forward point and including a pair of parts, one in a plane disposed parallel to and closely adjacent the plane of said landside section and the other part extending forwardly from the rear portion of said one part toward and to the forward edge of said moldboard section to a point adjacent but spaced landwardly of said one part.

3. In a plow, a plow bottom including a moldboard, a share, and a frog, said frog having a moldboard-receiving section and a landside-receiving section interconnected with said moldboard-receiving section, the lower edge of said moldboard-receiving section having a plurality of apertures in spaced apart relation extending from a point adjacent the landward end of the share to a point adjacent the furrowward end, said apertured portion forming share-receiving means, and frog-reenforcing means comprising a pair of parts connected with said sections and spaced apart to lie on opposite sides of the landward aperture in said moldboard-receiving section.

4. In a plow, a plow bottom including a moldboard, a share, and a frog, said frog having a moldboard-receiving section and a landside-receiving section interconnected with said moldboard-receiving section, the landside-receiving section terminating at the point of said frog in two portions attached to the lower landward portion of said moldboard-receiving section in spaced apart relation, the lower portion of said moldboard-receiving section being apertured at a point between said parts, and share-attaching means extending into said aperture.

5. In a plow, a frog comprising a landside section and a moldboard section said landside section having means forming forwardly divergent portions, one extending to the edge of said moldboard section and generally parallel to the landside section, and the other portion extending to the forward point of the frog and lying at an acute angle to said one portion.

6. In a plow, a frog comprising a landside section and a moldboard section, the lower forward portion of said moldboard section being arranged to receive a plow share, said landside section having a forward portion extending generally furrowwardly toward the edge of said share-receiving portion and another portion extending substantially parallel to the landside edge of said moldboard section, with a space between said parallel portion and said forward portion, said share-receiving portion of said moldboard section being apertured in said space to receive share attaching means.

7. In a plow, a frog comprising a landside section and a moldboard section, the lower forward portion of said moldboard section being arranged to receive a plow share, said landside section having a forward portion bent furrowwardly to extend generally toward the edge of said share-receiving portion and a reenforcing portion extending to the forward point of the frog and arranged divergently relative to said forward portion of said landside section and share-attaching means connected to said moldboard section between said forward portion and said reenforcing portion.

8. In a plow, a frog comprising a landside section and a moldboard section, the lower forward portion of said moldboard section being arranged to receive a plow share, said landside section having a forward portion bent furrowwardly to extend generally toward the edge of said share-receiving portion and a reenforcing portion extending to the forward point of the frog and arranged divergently relative to said forward portion of said landside section, and a landside fixed to the outer face of said landside section and disposed in coplanar relation with respect to said reenforcing portion.

9. In a plow, a frog comprising a landside section and a moldboard section, and a reenforcing part secured to said moldboard and landside sections and forming a portion of the latter, said reenforcing part having a first portion extending forwardly generally toward the lower edge of said moldboard section and a second portion extending substantially parallel to the landside edge of said moldboard section, and share-attaching means disposed between said first and second portions of said reenforcing part.

10. In a plow, a frog comprising a landside section and a moldboard section, and a reenforcing part secured to said moldboard and landside sections and forming a portion of the latter, said reenforcing part having a first portion extending forwardly generally toward the lower edge of said moldboard section and a second portion extending substantially parallel to the landside edge of said moldboard section, and a landside fixed to the outer face of said landside section and disposed in coplanar relation with respect to said second portion of said reenforcing part.

References Cited in the file of this patent
UNITED STATES PATENTS

| 320,656 | Hodgson | June 23, 1895 |
| 1,209,368 | Wiard | Dec. 19, 1916 |
| 1,669,025 | Seaholm | May 8, 1928 |